United States Patent [19]
Gillespie

[11] 3,869,314
[45] Mar. 4, 1975

[54] VENTED ELECTROCHEMICAL CELLS

[75] Inventor: Peter James Gillespie, Basingstoke, England

[73] Assignee: Energy Conversion Limited, London, England

[22] Filed: Feb. 8, 1973

[21] Appl. No.: 330,509

Related U.S. Application Data

[62] Division of Ser. No. 94,009, Dec. 1, 1970, Pat. No. 3,762,956.

[30] Foreign Application Priority Data

Dec. 3, 1969 Great Britain .................... 58918/69

[52] U.S. Cl. .............................. 136/86 A, 136/133
[51] Int. Cl. ......................................... H01m 29/02
[58] Field of Search ............... 136/86 A, 136, 133

[56] References Cited
UNITED STATES PATENTS

| | | | |
|---|---|---|---|
| 2,026,615 | 1/1936 | Corigliano et al. ................. | 136/133 |
| 2,103,714 | 12/1937 | Drummond ........................ | 136/133 |
| 2,759,038 | 8/1956 | Marsal .............................. | 136/136 |
| 2,848,525 | 8/1958 | Schumacher ..................... | 136/136 |

*Primary Examiner*—Donald L. Walton
*Attorney, Agent, or Firm*—Morgan, Finnegan, Durham & Pine

[57] ABSTRACT

Gas depolarized cell which includes a vent to allow the pressures interior and exterior of the cell to equalize. The vent comprises an aperture or volume closed by electrolyte-phobic, gas permeable material. This material is preferably a portion of the cathode of the cell. End cap crimping arrangements are also provided for sealing the ends of the cell.

10 Claims, 4 Drawing Figures

VENTED ELECTROCHEMICAL CELLS

This is a division of application Ser. No. 94,009, filed Dec. 1, 1970, now U.S. Pat. No. 3,762,956.

The invention relates to electrochemical cells and more particularly to gas depolarized cells.

According to one aspect of the invention, a gas depolarized cell includes a vent to allow the pressures interior and exterior of the cell to equalise, said vent comprising an aperture or volume closed by electrolyte-phobic gas permeable material.

According to a further aspect of the invention a gas depolarized cell comprises an anode electrode apertured to contain electrolyte for the cell and an electrolyte-phobic cathode electrode surrounding the anode electrode, the whole arrangement being such that whatever the physical attitude of the cell a portion of at least the electrolyte-phobic material of the cathode is available to a gas space within the cell to allow gas pressures interior and exterior of the cell to equalise.

According to a still further aspect of the invention a gas depolarized cell comprises a tubular anode which is apertured to provide an electrolyte reservoir, a tubular cathode electrode formed of electrolyte-phobic material which extends beyond the anode at each end therof to respective end caps and a predetermined volume of liquid electrolyte which does not completely fill the interior of the cell, whereby at least one or portions of said cathode extension portions are free of electrolyte to allow unwanted gases within the cell to vent to the exterior of the cell and to allow gas pressures interior and exterior of the cell to equalize.

According to yet a further aspect of the invention there is provided a gas depolarized cell including at least one end cap for the cell having a circumferentially extending member or flange portion which acts as a backing member abutted by one end of a tubular cathode electrode, a seal being located around said end of the cathode and an outer circumferential lip portion of the end cap being crimped or otherwise turned over the seal to force said end of the cathode electrode against said member or flange portion.

Preferably the cathode electrode is cylindrical.

Said circumferentially extending member may comprise an annular member formed of an electrically insulating material such as a synthetic plastics. In this arrangement an electrically conductive member or portion may extend from the end cap to an anode electrode of the cell to both electrically connect it to and mechanically position it with respect to the end cap. A foraminated metal outer casing may be crimped or otherwise attached to the end cap, either directly or with electrically insulating material interposed therebetween.

Alternatively, the flange comprising the backing member may be integrally formed of the electrically conductive material of the end cap or by a separate member of electrically conductive material abutting and possibly fixed to the end cap. In this arrangement a member of electrically insulating material is provided to locate an or the anode electrode with respect to the end cap of the cell. A or the foraminated metal outer casing may be crimped or otherwise attached to the end cap with an electrically insulating spacer interposed therebetween.

The cell may have an end cap as defined by the next preceding paragraph at one end thereof and an end cap as defined by the next but one preceding paragraph at the other end thereof, such end caps providing the respective terminals for the cells.

According to a still further aspect of the invention an outer casing for a gas depolarized cell comprises a tubular, foraminated member with a tear-off portion carried thereon, said portion closing the apertures of the foraminated member whilst carried thereon.

The outer casing may be adapted to be crimped or otherwise fixed, for example by heat shrinking, between the end caps of a cell or battery of cells.

The tear-off portion may comprise a sheet of plastics material of the so-called self-adhesive type or tube of plastics material of the so-called heat shrinking type.

Such an outer casing may be utilised with a cell as hereinbefore defined in the second to sixth paragraphs inclusive.

The foregoing and further features of the invention may be more readily understood from the following description of some preferred embodiments thereof, by way of example, with reference to the accompanying drawing, in which.

Figure 1:
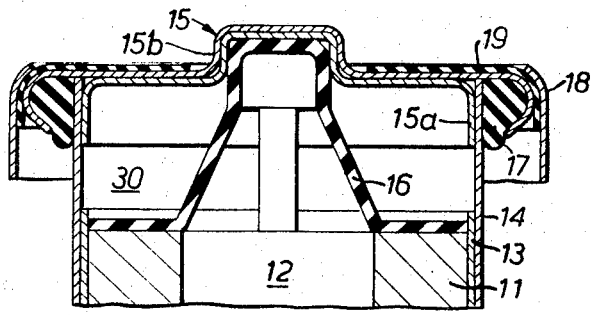
FIG. 1 is a side sectional view of one end of a cylindrical gas depolarized primary cell.

Referring now particularly to FIG. 1 of the drawing there is shown a side sectional view of one end of a gas depolarize primary cell, such as a metal (e.g. zinc)/oxygen (e.g., air) cell, illustrating an end cap connection in which the end cap acts as the positive terminal of the cell, i.e., is connected to the cathode electrode.

The cell comprises a cylindrical, porous anode electrode 11 formed with a central aperture 12 which serves as a revervoir for electrolyte which may be an aqueous solution of potassium hydroxide. Around the anode 11 is wrapped an electrolyte pervious separator 13 which spaces the anode 11 from a cathode electrode 14 which extends around the separator 13.

The end cap is generally indicated at 15 and comprises an inner generally cup-shaped metal portion 15a and an outer generally cup-shaped metal portion 15b. Both portions 15a and 15b have central nose parts which interengage and are spot welded together. An electrically insulating spacer 16 engages within the nose part of inner portion 15a and serves to space the anode 11 from the end cap 15.

The inner portion 15a is formed at its periphery with an inwardly directed rim which forms a backing member against which the end of the cathode 14 engages. An O-ring seal 17 surrounds the cathode 14 where it engages the backing member and the outer periphery of the outer portion 15b is crimped or otherwise turned over around the seal ring 17 to squash it and the end of the cathode 14 against the backing member.

A foraminous, metal outer casing 18 has its end crimped or turned over the crimped outer periphery of outer portion 15b with an electrically insulating spacer 19 interposed therebetween.

It should be noted that the cathode 14 is rigidly connected to the end cap 15 so no further electrical connection is required.

The electrolyte (not shown) for the cell is arranged to have a volume which does not fill the cell so that unwanted gas generated in the cell or pressure build-ups are allowed to vent through the portion of the cathode 14 which extends between the anode 11 and the end cap 15 in volume 30.

The cathode active constituents and the internal details of the structure do not form a part of this invention so is not further described. However, a suitable cathode structure is fully described in copending United Kingdom patent application No. 19739/68, corresponding to U.S. Ser. No. 224,981, filed Feb. 9, 1972 and U.S. Ser. No. 817,940, filed Apr. 21, 1969, both now abandoned in favor of continuation application Ser. No. 357,167, filed May 4, 1973.

As is now understood in the art, typical cathodes may include a current collector of some kind, such as a porous metal plate, or a wire or screen, coated with a catalytic substance, the catalytic structure being covered on its outside surface by a separate hydrophobic layer so as to permit the inward passage of gas but restricting the outward passage of the wet electrolyte. All elements of the cathode may be separate or suitably joined, as by molding, to form an integral cathode structure. Any of these cathodes is suitable for use in the invention. The hydrophobic material is alone extended between the anode 11 and end cap 15.

Figure 2:
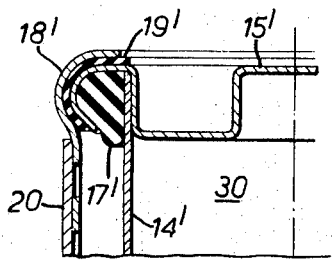
FIG. 2 is a side sectional view of half of one end of a cylindrical gas depolarized primary cell.

Referring now to FIG. 2 there is shown a similar cell end cap arrangement to that shown in FIG. 1 except that the inner and outer portions 15a and 15b are replaced by a single member 15' which is shaped to form the backing member portion for the crimping of the assembly. Further this arrangement also illustrates a tear-off protective member 20 fixed around the foraminous outer casing 18'. The member 20 may be a plastics sheet of the so-called self-adhesive type, or a tube of heat shrinkable plastics, and serves to prevent air from entering to the cathode 14' until the cell is required for use.

Figure 3:
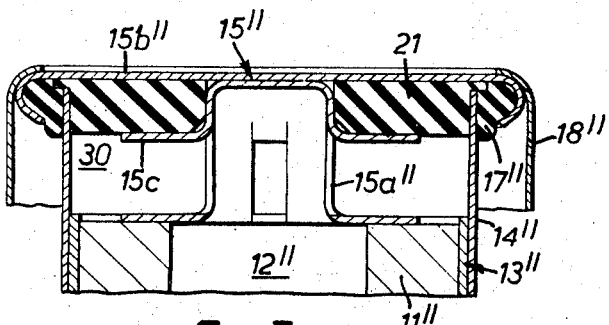
FIG. 3 is a side sectional view of one end of a cylindrical gas depolarize primary cell.

Referring now to FIG. 3 there is shown a side sectional view of one end of a gas depolarized primary cell, such as a metal (e.g., zinc)/oxygen (e.g., air) cell, illustrating an end cap connection in which the end cap acts as the negative terminal of the cell, i.e., is connected to the anode.

The electrode arrangement of this cell is identical to that described for FIG. 1.

The end cap 15" again comprises an inner portion 15a" and an outer portion 15b", but the outer portion 15b" does not have a nose part. The inner portion 15a" in this cell serves to space the anode 11" from the end of the cell and since it directly contacts the anode 11" obviates the need for any further electrical connection to it. Tabs 15c are bent from the inner portion 15a" to support an electrically insulating spacer 21 which serves to insulate the cathode 14" from the end cap 15" and serves as the backing member for the crimping. Apart from the fact that no electrical insulation is required between the outer case 18" and the crimped rim of outer portion 15b" the remainder of this arrangement is identical to that of FIG. 1.

A primary cell may be provided with an end cap arrangement as shown in FIGS. 1 or 2 at one end and an end cap arrangement as shown in FIG. 3 at the other end. It should be realized that with such an arrangement any unwanted gases in the cell will be satisfactorily vented to the atmosphere irrespective of the physical orientation of the cell.

Figure 4:
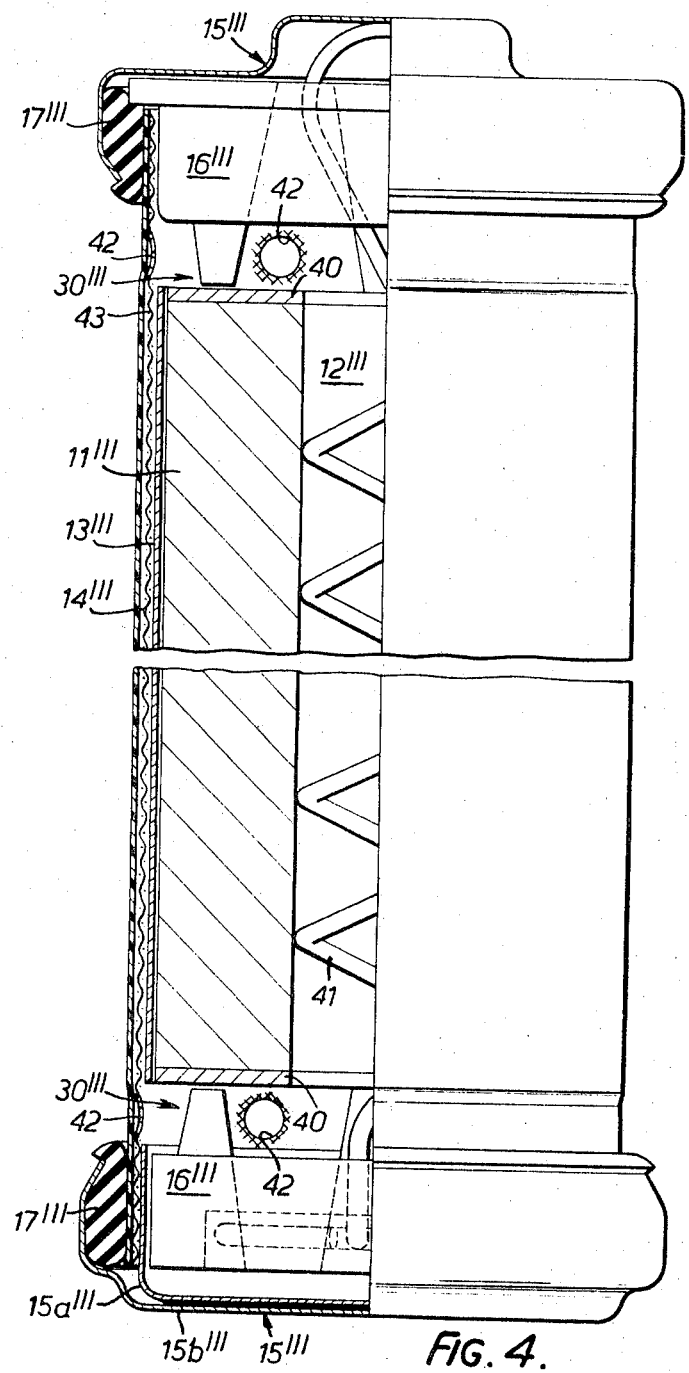
FIG. 4 is a side elevational view, part in section, of a cylindrical gas depolarize primary cell.

Referring now to FIG. 4 there is shown a full primary cell with an end cap at the bottom similar to that of FIG. 1 and an end cap at the top similar to that of FIG. 3. In this arrangement a spacer 16''' of electrically insulating material is used at the top end cap as the backing member for the end of the cathode 14'''. At the bottom the spacer 16''' merely acts as a spacer and cup 15a''' acts as a backing member. Each spacer 16''' comprises an annular portion with three legs which abut a retaining disc 40, one at each end of anode 11'''. A current collector, such as the spiral conductor 41, for the anode, is located in the bottom spacer 16''' and passes through the anode 11''' in contact with its inner surface, through upper spacer 16''' and is soldered or otherwise fixed to the upper end cap 15''''. Alternatively a straight blade of springy electrically conductive material may be attached to the end cap 15'''' and driven into the anode aperture to provide current collection.

The preferred cathode structure 14 for the invention is best seen from FIG. 4. Basically, the cathode includes a current collecting metal wire mesh 43 surrounded by the hydrophobic material of the cathode which extends with the mesh axially beyond the end of the anode to be engaged by the element 17''' of the end cap. The mesh 43 is coated with a catalyst material in accordance with known practice, but the catalyst technique does not per se constitute part of the present invention.

Aperture 42 may be formed in a current collector mesh 43 of the cathode 14''' around the volume 30''' so that the hydrophobic material of the cathode 14''' does not become wetted by the electrolyte and so prevent venting of gases therethrough.

In this specification the term "foraminated" member is intended to include a porous member in which the pores are interconnected.

The end cap arrangements and venting described and illustrated herein could advantageously be utilized with the cells described in our copending United Kingdom patent application No. 26600/69 now British Patent No. 1,256,419.

I claim:

1. A gas depolarized cell comprising:
   a. an anode electrode, the anode electrode being apertured to contain electrolyte for the cell,
   b. a cathode, the cathode including a layer of electrolyte-phobic material and surrounding the anode electrode,
   c. an end cap closing at least one end of the cathode and structurally joined to the cathode, the cathode forming at the interior thereof a space, the electrolyte-phobic material of the cathode providing a surface through which gas within said interior space of the cell may pass to the exterior to allow gas pressures interiorly and exteriorly of the cell to equalize; and
   d. an outer casing pervious to gas engaging the end cap and surrounding the cathode in spaced relation thereto.

2. A gas depolarized cell as claimed in claim 1, wherein the cathode electrode comprises a current collector, a catalyst and the electrolyte-phobic layer, the electrolyte-phobic layer only extending axially beyond the end of the anode at the portion where the gas is to pass therethrough for the equalization of the internal and external pressures.

3. The cell of claim 2 wherein: the end cap overlies and is secured to the cathode portion having the electrolyte-phobic layer.

4. The cell of claim 1, further comprising:
a tear-susceptible layer of gas impervious material removably contacting the exterior surface of the outer casing to preclude the passage of gas therethrough until the cell is put into service.

5. A gas depolarized cell comprising:
a. an anode, the anode being tubular to provide an electrolyte reservoir therein;
b. end caps, one at each end of the cell;
c. a cathode, the cathode being tubular, surrounding the anode and being formed in part of electrolyte-phobic material which extends beyond the anode at each end thereof to said end caps to form an interior space at each end of cell bounded by the cathode, and
d. a predetermined volume of electrolyte which does not completely fill the interior of the cell,
the whole arrangement being such that at least one of said spaces is free of electrolyte irrespective of the attitude of the cell so as to allow unwanted gases within the cell to vent to the atmosphere and to allow gas pressures interior and exterior of the cell to equalize.

6. In a gas depolarized cell;
an anode;
a cathode surrounding the anode and comprised in part of an electrolyte-phobic layer and a porous current collecting conductive mesh extending axially beyond the anode to form at the interior of the cathode a void for the collection of gases at the interior of the cell, at least a portion of the cathode being pervious to the collected gases, the electrolyte-phobic layer of the cathode providing an interface between the exterior of the cell and the void to retain electrolyte but permit the passage of gas therethrough to relieve pressure at the cell interior; and
an end cap sealing the cell and joined structurally and electrically to the cathode conductive mesh.

7. The cell of claim 6, wherein;
the mesh has apertures therethrough adjacent the void to expose the electrolyte-phobic layer to collected interior gas.

8. In a gas depolarized cell;
an anode;
a tubular cathode surrounding the anode and comprised in part of an electrolyte-phobic layer and a porous current collector extending axially beyond the anode to form at the interior of the cathode a void for the collection of gases at the interior of the cell, at least a portion of the cathode being pervious to the collected gases, the electrolyte-photic layer of the cathode providing an interface between the exterior of the cell and the void to retain electrolyte but permit the passage of gas therethrough to relieve pressure at the cell interior;
an end cap sealing the cell and joined structurally to the cathode;
an insert associated with the end cap and providing an annular support surface generally parallel to the cathode at the interior end thereof; and
means associated with the end cap radially compressing the cathode inwardly against the support surface, the end cap overlying the insert.

9. The gas depolarized cell of claim 8 wherein:
the porous current collector comprises a conductive mesh having an aperture therethrough in at least one location adjacent the void.

10. The cell of claim 8, wherein:
the end cap is in electrical contact with the cathode.

* * * * *